United States Patent [19]

Thillet et al.

[11] 4,052,769

[45] Oct. 11, 1977

[54] MACHINE FOR OPENING A SEVERED BOVINE OR OVINE HEAD

[76] Inventors: Antoine Thillet, 5 Chemain du Signal, Sainte Foy, (Lyon); Tomaso Morello, 5 rue Albert Camus, Decines, both of France

[21] Appl. No.: 549,048

[22] Filed: Feb. 14, 1975

[30] Foreign Application Priority Data

Feb. 15, 1974 France .................................. 74.05858

[51] Int. Cl.² .............................................. A22B 5/20
[52] U.S. Cl. .............................................................. 17/23
[58] Field of Search .................. 17/23, 1, 1 R, 1 A; 30/308; 83/679, 697

[56] References Cited

U.S. PATENT DOCUMENTS

| 2,829,398 | 4/1958 | Carpenter | 17/23 |
| 2,832,410 | 4/1958 | Sons | 17/23 |
| 3,105,993 | 10/1963 | Cook et al. | 17/23 |

FOREIGN PATENT DOCUMENTS

| 160,689 | 1/1955 | Australia | 17/23 |
| 485,878 | 8/1952 | Canada | 17/23 |
| 274,674 | 11/1968 | U.S.S.R. | 17/23 |
| 249,966 | 12/1969 | U.S.S.R. | 17/23 |

*Primary Examiner*—Hugh R. Chamblee
*Attorney, Agent, or Firm*—Karl F. Ross

[57] ABSTRACT

An apparatus for opening a severed bovine or ovine head has a base provided with a pair of upwardly directed and parallel base blades spaced to support the head. A vertical displaceable guillotine blade is directed downwardly toward the base blades and has a downwardly concave central portion and a pair of side portions flanking the central portion and each having a vertical upper region terminating at the central portion and a lower region extending downwardly from the upper region laterally away from the other side portion. Thus the side portions and the central portion form a downwardly open outwardly flaring U adapted to embrace and split the skull of a head resting on the base blades. This machine enables the rear end of the skull to be removed for subsequent removal of a perfectly intact brain.

5 Claims, 8 Drawing Figures

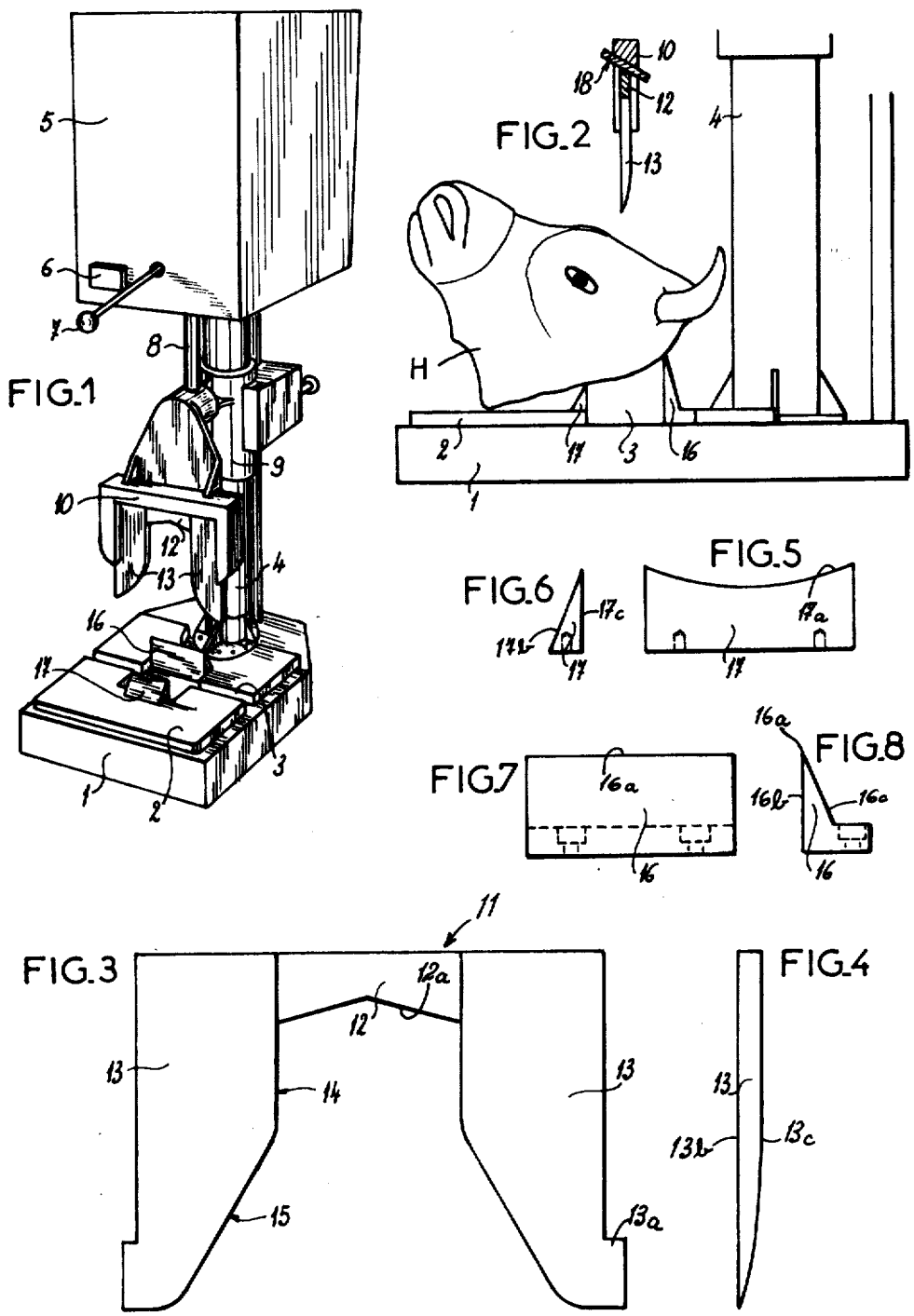

MACHINE FOR OPENING A SEVERED BOVINE OR OVINE HEAD

FIELD OF THE INVENTION

The present invention relates to an apparatus for opening a severed livestock head. More particularly this invention concerns an apparatus for opening a bovine or ovine head.

BACKGROUND OF THE INVENTION

A guillotine-type machine is known for splitting a severed pig head. This device simply longitudinally bisects the entire head, which is traditionally cooked with the skull attached. Such a machine is, however, not suitable for use with a bovine or ovine head wherein the brain is fully separated from the skull prior to cooking.

Thus the practice has been for a skilled butcher to chop away the back part of the skull and carefully remove the brain. Such an operation is inherently expensive as it is relatively skilled work, because the brain must be maintained in good condition for resale. For this reason sheep and beef brains are relatively expensive.

OBJECTS OF THE INVENTION

It is therefore an object of the present invention to provide an automatic machine for opening a severed bovine or ovine head.

Another object is the provision of such an apparatus which can be operated even by relatively unskilled workers, but which nonetheless preserves the brain in good condition.

SUMMARY OF THE INVENTION

These objects are attained according to the present invention in an apparatus having a base on which is provided a pair of upwardly directed and parallel base blades spaced apart so as to support the head. A vertically displaceable blade is directed downwardly toward the base and has a downwardly concave central portion and a pair of side portions flanking the central portion and forming therewith a downwardly open outwardly flaring U adapted to embrace and split the skull of the severed head. Each of the side portions has a generally vertical upper region terminating at the central portion and a lower region extending downwardly from the upper region or generally away from the other side. Means is provided for vertically displacing the displaceable blade toward and away from the base parallel to the base blades.

The base blades according to the present invention are so arranged that one serves to maintain the head at the desired inclination by supporting the back upper portion of the head and the other rests against the back part of the skull adjacent the cerebellum.

The apparatus according to the present invention functions automatically to center the severed head on the base. This is effected by the outwardly directed lower regions of the side portions of the vertically displaceable upper blade. As the blade descends over a poorly centered head one or the other of the lower regions of the side portions deflects the head inwardly to center it exactly under the upper blade. The downwardly concave central portion of the upper blade serves to split the skull without entering far enough to damage the brain.

In accordance with the present invention the blades are all tapered outwardly like wedges so as to insure that the skull is indeed split open. In addition the upper blade is provided spaced above the cutting edge of its central portion with an inclined pressing surface that extends transverse to the direction of displacement of the blade and prevents penetration of the blade beyond a predetermined distance into the head. Thus as the vertical blade descends it will enter the skull by this predetermined distance and thereafter press the skull down on the two base blades. In this manner a very neat and effective splitting of the skull is obtained that allows a piece to be removed from its top regions. Thereafter removal of the perfectly intact brain is relatively easy. This pressing surface according to the present invention is inclined to the horizontal and lies at an angle corresponding to the face of the skull so that the head is pressed flatly down against the blades.

BRIEF DESCRIPTION OF THE DRAWING

The above and other objects, features, and advantages of the invention will become more readily apparent from the following description reference being made to the accompanying drawing in which:

FIG. 1 is a perspective view of the apparatus according to this invention;

FIG. 2 is a side view of the apparatus according to this invention, partly in section, with a severed head in place on the base;

FIGS. 3 and 4 are large-scale front and side views, respectively, of the upper guillotine blade according to this invention;

FIGS. 5 and 6 are front and side views of the front base blade according to the present invention; and FIGS. 7 and 8 are front and side views of the back base blade according to the present invention.

SPECIFIC DESCRIPTION

The apparatus according to the present invention comprises a steel base 1 having a base plate 2 split at 3. A cylindrical steel column 4 projects vertically upwardly from the base 1 and carries a console 5 housing a hydraulic pump operated by a push-button switch 6, a control valve operated by a rod 7 and a double-acting hydraulic cylinder whose piston rod is shown at 8. A guide sleeve 9 slidable along the column 4 is carried on the piston rod 8 and a blade holder 10 is also carried on this rod.

The holder 10 carries a vertically displaceable guillotine blade 11 which is engageable in the split 3 between a pair of base blades 16 and 17 carried on the base 2. The guillotine blade 11 comprises a central portion 12 having a downwardly directed and downwardly V-shaped cutting edge 12a. This central portion 12 is flanked by a pair of side portions 13 each comprising a vertical upper region 14 and an outwardly extending lower region 15. In addition each of these side regions 13 is formed with a small gear 13a for force transmission directly to the holder 10. The front face 13b of the blade 11 is perfectly planar and the rear face 13c is tapered upwardly. This insures that a skull of a severed head H pressed down (FIG. 2) will be split and that should any juices squirt from the head during the cutting they will be directed backwardly away from the operator, that is toward the column 4.

As shown in FIGS. 5-8 the front blade 17 is substantially shorter than the back blade 16, and is formed with an upwardly concave cutting edge 17a. This blade is shaped as a wedge with an inclined front face 17b and a perfectly vertical back face 17c. The back blade 16, which is mentioned above, is shorter than the front blade 17, has a straight cutting edge 16a and a vertical front face 16b and inclined back face 16a. Thus the blades 11, 16 and 17 will act as wedges to that when they enter the skull they will force it apart to either side of the split formed therein. This insures that the back end of the skull can readily be removed for subsequent removal of an intact blade. Also these wedge formations inclined in opposite directions prevent forward or backward slipping of the head during splitting.

The outwardly flaring lower regions 15 of the blade 11 insure that the head H, even though not perfectly centered on the blades 16 and 17, will automatically be centered after the button 6 is actuated and the blade 11 is lower down over it.

In use the head H is positioned as shown in FIG. 2, with the short front blade resting approximately midpoint in the back of the skull and the taller rear blade lying at the very back of the skull. The blade 11 therefore splits the back portion off the skull. The front face of this head H lies at an angle of between 50° and 70° (here 60°) which is identical to the inclination angle of a flat stop element 18 arranged just above the blade 12 and insuring that this blade 12 wil not enter beyond a predetermined distance, that is the distance between its edge 12a and the element 18, into the head H. The inclination of this stop 18 is substantially identical to that assumed by the face of the head H so that once it lies against the face it will push the head down onto the blades 16 and 17 and insure proper splitting of the skull.

The blades 11, 16 and 17 can be exchanged for blades of different sizes for different types of livestock, although a single blade 11 is usable for heads in a wide range of sizes. The pressure exerted by the double-acting cylinder having a piston rod 8 is controlled by the arm 7. In addition the double-acting cylinder is provided with a spring that automatically raises the holder 10 as soon as the button 6 is released. With such a machine it is been found possible for a relatively unskilled worker to open three heads per minute. This rate is substantially greater than obtainable by a highly skilled butcher.

We claim:

1. An apparatus for opening a severed livestock head, said apparatus comprising:
   a base;
   a pair of upwardly directed and parallel base blades on said base spaced to support said head at the back thereof;
   a vertically displaceable blade of wedge-shaped cross section directed downwardly toward said base blades and positioned to open the back of said transversely thereto, said vertically displaceable blade having a downwardly concave central portion and a pair of symmetrical side portions flanking said central portion and each having a generally vertical upper region terminating at said central portion and a lower region extending downwardly from said upper region laterally away from the other side portion, said side portions and said central portion forming a downwardly open outwardly flaring U adapted to embrace and split the skull of said head; and
   means for vertically displacing said displaceable blade toward and away from said base blades while maintaining said displaceable blade parallel to said base blades, said displaceable blade being engageable between said base blades, each of said blades having a first face substantially parallel to the displacement direction of said displaceable blade and a second face inclined to said direction and forming with the respective first face a cutting edge, at least one of said base blades being upwardly concave at its cutting edge, said means for displacing including a holder for said displaceable blade having a pressing element with a pressing surface lying transverse to the displacement direction of said displaceable blade, said displaceable blade having a cutting edge spaced in said direction from said surface by a predetermined distance corresponding to the penetration distance of said displaceable blade into said head, said head having an upper face lying at a predetermined angle when said head is resting on said base blades, said pressing surface being inclined to the vertical at substantially the same angle as said face.

2. The apparatus defined in claim 1 wherein said first faces parallel to said direction of said base blades are turned toward each other.

3. The apparatus defined in claim 1 wherein one of said base blades is substantially taller than the other base blade.

4. The apparatus defined in claim 3 wherein said other base blade has an upwardly concave cutting edge.

5. The apparatus defined in claim 1 wherein said base is formed with an upwardly open slit between said base blades said displaceable blade being engageable in said split.

* * * * *